(12) United States Patent
Lee et al.

(10) Patent No.: US 11,798,382 B2
(45) Date of Patent: Oct. 24, 2023

(54) HAPTIC SIGNAL GENERATING METHOD AND DEVICE USING AUDIO SIGNAL PATTERN

(71) Applicant: DONG WOON ANATECH CO., LTD, Seoul (KR)

(72) Inventors: Jeonghoon Lee, Yongin-si (KR); Inwoo Han, Seoul (KR); Kwangsung Jung, Gunpo-si (KR)

(73) Assignee: DONG WOON ANATECH CO., LTD, Seoul (KR)

( * ) Notice: Subject to any disclaimer, the term of this patent is extended or adjusted under 35 U.S.C. 154(b) by 97 days.

(21) Appl. No.: 17/405,977

(22) Filed: Aug. 18, 2021

(65) Prior Publication Data

US 2021/0383661 A1   Dec. 9, 2021

Related U.S. Application Data

(63) Continuation of application No. PCT/KR2020/002437, filed on Feb. 19, 2020.

(30) Foreign Application Priority Data

Feb. 19, 2019 (KR) .................. 10-2019-0019182

(51) Int. Cl.
*H04B 3/36* (2006.01)
*G08B 6/00* (2006.01)
*G06F 3/16* (2006.01)

(52) U.S. Cl.
CPC .............. *G08B 6/00* (2013.01); *G06F 3/16* (2013.01)

(58) Field of Classification Search
CPC ... G08B 6/00; G06F 3/16; G06F 3/016; G06F 3/167
See application file for complete search history.

(56) References Cited

U.S. PATENT DOCUMENTS

| 9,715,276 B2* | 7/2017 | Da Costa ................. G08B 6/00 |
| 2012/0206246 A1* | 8/2012 | Cruz-Hernandez ..... G06F 3/016 340/407.1 |

(Continued)

FOREIGN PATENT DOCUMENTS

| KR | 10-2004-0062559 A | 7/2004 |
| KR | 10-2009-0130833 A | 12/2009 |

(Continued)

OTHER PUBLICATIONS

International Search Report issued in PCT/KR2020/002437; dated Jul. 9, 2020.

*Primary Examiner* — Toan N Pham
(74) *Attorney, Agent, or Firm* — Studebaker & Brackett PC

(57) ABSTRACT

The present invention relates to a haptic signal generating method including: generating a signal pattern consisting of a size of a signal for each time and frequency band by analyzing a received audio signal; comparing a target audio signal pattern and the generated signal pattern; and generating a haptic signal corresponding to the target audio signal pattern when a matching rate exceeds a threshold value as a result of the comparison, and when there is a specific audio signal desired to be output as a haptic signal among various audio signals, a specific audio signal pattern may be detected and an appropriate haptic signal may be connected to the detected specific audio signal pattern as an output.

7 Claims, 3 Drawing Sheets

(56) References Cited

U.S. PATENT DOCUMENTS

2012/0306631 A1* 12/2012 Hughes ............... H04M 19/047
                                                      340/407.1
2013/0163785 A1*  6/2013 Lee ........................ H03J 7/00
                                                        381/103

FOREIGN PATENT DOCUMENTS

| KR | 10-0969870 B1    | 7/2010  |
|----|------------------|---------|
| KR | 10-2011-0076283 A | 7/2011  |
| KR | 10-2012-0126446 A | 11/2012 |
| KR | 10-2014-0030053 A | 3/2014  |
| KR | 10-2014-0114238 A | 9/2014  |

\* cited by examiner

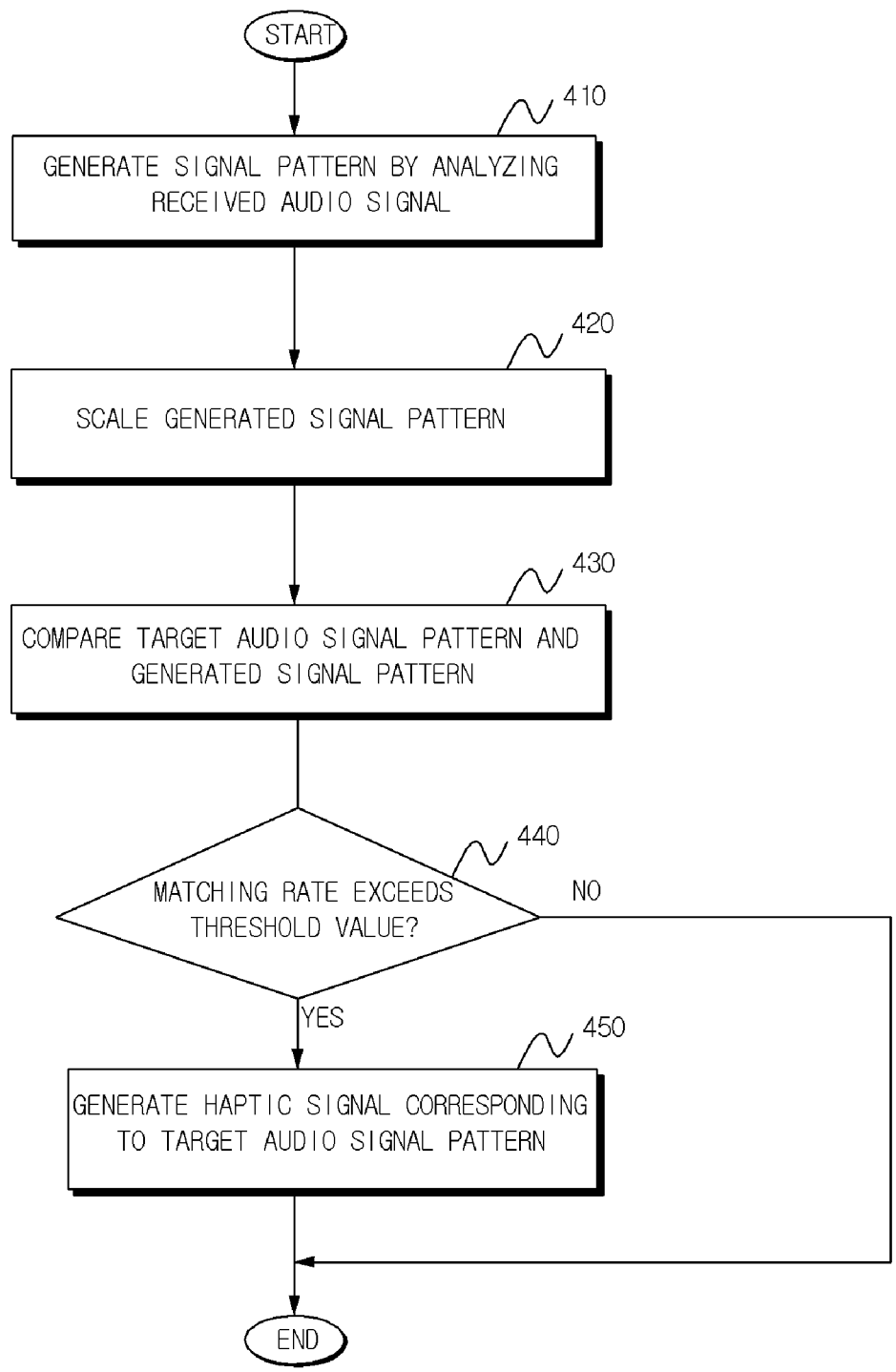

HAPTIC SIGNAL GENERATING METHOD AND DEVICE USING AUDIO SIGNAL PATTERN

CROSS-REFERENCE TO RELATED APPLICATIONS

The present application is a continuation of International Patent Application No. PCT/KR2020/002437, filed on Feb. 19, 2020, which is based upon and claims the benefit of priority to Korean Patent Application No. 10-2019-0019182, filed on Feb. 19, 2019. The disclosures of the above-listed applications are hereby incorporated by reference herein in their entirety.

TECHNICAL FIELD

The present invention relates to a haptic signal generating method, and more particularly, to a method and a device for generating a haptic signal by using an audio signal pattern, in which when a specific audio signal desired to be output as a haptic signal exists in various audio signals, a specific audio signal pattern is detected, and an appropriate haptic signal is connected to the detected audio signal pattern as an output.

BACKGROUND ART

Products that support haptic technology enable users to feel more realistic and immersive by adding tactile information. However, in order to implement the haptic technology by using contents that do not include tactile information in the past, a vibration pattern must be planted in the corresponding content in advance for a specific time and purpose when the contents are played, thereby requiring a lot of time, effort, and cost. In order to solve the problem, when there is an existing audio signal, a haptic technology that automatically converts the audio signal to a haptic signal is required.

Reviewing the existing technology, most representatively, when an audio signal is converted into a haptic signal, the audio signal is analyzed in the time domain or the frequency domain, a signal focused on a specific region is drawn by using a filter, and the drawn signal is connected as a haptic. However, the method of generating the haptic signal by using the pattern of the time and the frequency of the audio signal is not used in the related art, and the method of using a result of the analysis of the audio signal in the time domain or the frequency domain is mainly used.

Prior Art 1 (Korean Patent Application Laid-Open No. 10-2011-0076283) is the technology for the method and the device of providing feedback according to a user input pattern, and an input audio pattern consists of the type of sound source to be generated in response to the user input pattern, generation maintenance time, sound volume, and the like.

Prior Art 2 (Korean Patent Application Laid-Open No. 10-2012-0126446) is the technology for the device for generating vibration feedback from an input audio signal, and a haptic signal is generated by deriving a parameter including at least one of vibration intensity and vibration roughness from an audio signal.

Prior Art 1 or Prior Art 2 generates a haptic signal by a completely different method from the method of generating a haptic signal by using a pattern of time and frequency of an audio signal.

DISCLOSURE

Technical Problem

Accordingly, the first problem to be solved by the present invention is to provide a haptic signal generating method, in which there is a specific audio signal desired to be output as a haptic signal among various audio signals, a specific audio signal pattern is detected, and an appropriate haptic signal is connected to the detected specific audio signal pattern as an output.

The second problem to be solved by the present invention is a haptic signal generating device, which has a high hitting rate because an output haptic signal is matched to a preset audio signal pattern and is capable of fundamentally blocking the generation of unwanted haptic signal, such as background sound or human voice.

Further, the present invention provides a computer readable recording medium in which a program for executing the method in a computer is recorded.

Technical Solution

In order to achieve the first problem, the present invention provides a method of generating a haptic signal, the method including: generating a signal pattern consisting of a size of a signal for each time and frequency band by analyzing a received audio signal; comparing a target audio signal pattern and the generated signal pattern; and generating a haptic signal corresponding to the target audio signal pattern when a matching rate exceeds a threshold value as a result of the comparison.

According to an exemplary embodiment of the present invention, the method may further include scaling the generated signal pattern in consideration of a difference in a size between a feature point of the generated signal pattern and a feature point of the target audio signal pattern.

Further, the matching rate may be calculated based on a difference between feature points by extracting the feature points of the target audio signal pattern and the generated signal pattern.

In order to achieve the second object, the present invention provides a device for generating a haptic signal, the device including: a signal pattern generating unit for generating a signal pattern consisting of a size of a signal for each time and frequency band by analyzing a received audio signal; a pattern comparing unit for comparing a target audio signal pattern and the generated signal pattern; and a haptic signal generating unit for generating a haptic signal corresponding to the target audio signal pattern when a matching rate exceeds a threshold value as a result of the comparison.

According to an exemplary embodiment of the present invention, the device may further include a scaling unit for scaling the generated signal pattern in consideration of a difference in a size between a feature point of the generated signal pattern and a feature point of the target audio signal pattern.

Further, the pattern comparing unit may extract the feature points of the target audio signal pattern and the generated signal pattern and calculates the matching rate based on a difference between feature points.

In order to solve another technical object, the present invention provides a computer-readable recording medium in which a program for executing the method of generating the haptic signal in a computer is recorded.

Advantageous Effects

According to the present invention, a haptic signal is basically generated from an audio sound, but a system is configured in the form responding to an input of a user, thereby providing a more realistic haptic result.

Further, according to the present invention, when a haptic signal is output by preferentially considering a user input, it is possible not to fundamentally respond to an unwanted audio signal.

Furthermore, according to the present invention, when a haptic output of an audio signal is generated through interaction with a user input, it is possible to additionally receive input information of the user without relying only on the audio signal. Therefore, when an audio signal is converted to a haptic signal by using both two types of information, it is possible to obtain more satisfactory vibration.

BRIEF DESCRIPTION OF THE DRAWINGS

FIG. 4 is a flowchart illustrating a haptic signal generating method according to the exemplary embodiment of the present invention.

BEST MODE

Figure 1:
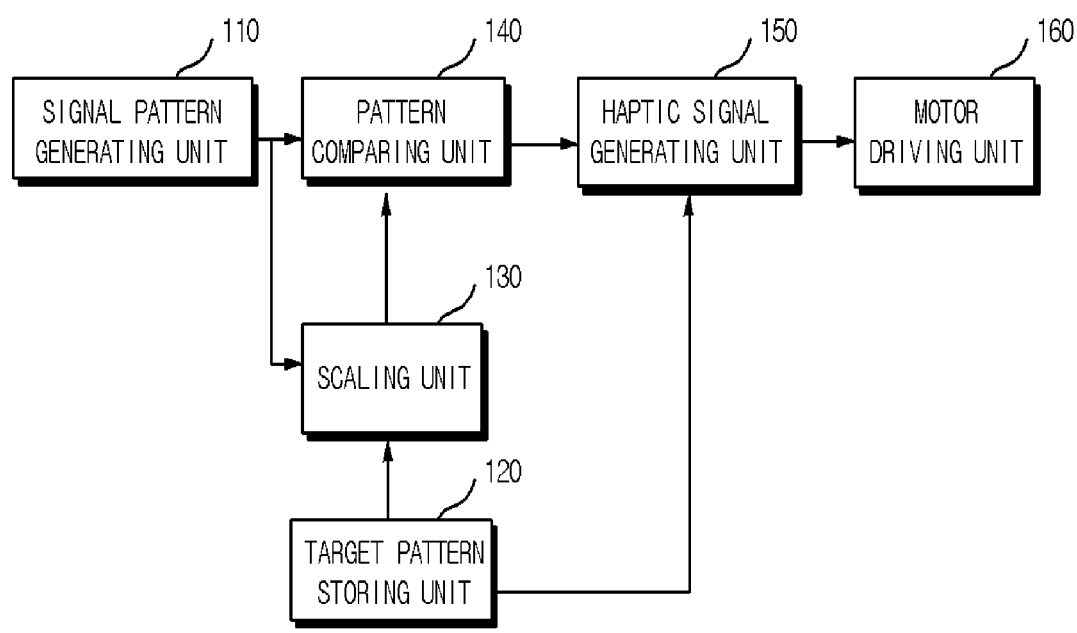
FIG. 1 is a configuration diagram illustrating a haptic signal generating device according to an exemplary embodiment of the present invention.

In order to achieve the object, the present invention provides a method of generating a haptic signal, the method including: generating a signal pattern consisting of a size of a signal for each time and frequency band by analyzing a received audio signal; comparing a target audio signal pattern and the generated signal pattern; and generating a haptic signal corresponding to the target audio signal pattern when a matching rate exceeds a threshold value as a result of the comparison.

MODE FOR CARRYING OUT THE INVENTION

Hereinafter, exemplary embodiments will be described in detail with reference to the accompanying drawings so that those skilled in the art can easily implement the present invention. However, the exemplary embodiments re for describing the present invention in more detail, and it will be apparent to those skilled in the art that the scope of the present invention is not limited thereto.

The configuration of the invention for clarifying the solution to the problem to be solved by the present invention will be described in detail with reference to the accompanying drawings based on the exemplary embodiment of the present invention, and it should be noted in advance that in assigning reference numerals to the components of the drawings, the same reference numeral is assigned to the same component even though the component is included in a different drawing, and components of other drawings may be cited if necessary when the drawing is described. In the description of an operation principle of the exemplary embodiment of the present invention, when a detailed description of a related publicly known function or constituent element is determined to unnecessarily make the subject matter of the present invention unclear, the detailed description and a detailed illustration thereof will be omitted.

FIG. 1 is a configuration diagram illustrating a haptic signal generating device according to an exemplary embodiment of the present invention.

Referring to FIG. 1, the haptic signal generating device according to the exemplary embodiment includes a signal pattern generating unit 110, a target pattern storing unit 120, a scaling unit 130, a pattern comparing unit 140, a haptic signal generating unit 150, and a motor driving unit 160.

The signal pattern generating unit 110 analyzes a received audio signal and generates a signal pattern consisting of a size of a signal for each time and frequency band.

The signal pattern generating unit 110 may analyze an audio signal in a time domain or convert an audio signal into a frequency domain and analyze the audio signal. When the audio signal is converted into the frequency domain, the audio signal may be converted into the frequency domain for each frequency band by using Fast Fourier Transform (FFT).

The target pattern storing unit 120 stores an audio signal pattern desired to generate a haptic signal as a target audio signal pattern. Further, the target pattern storing unit 120 may store a haptic signal corresponding to the stored target audio signal pattern.

Figure 2:
FIG. 2 illustrates a waveform of an audio signal according to time.

FIG. 2 illustrates a waveform of an audio signal according to time.

Figure 3:
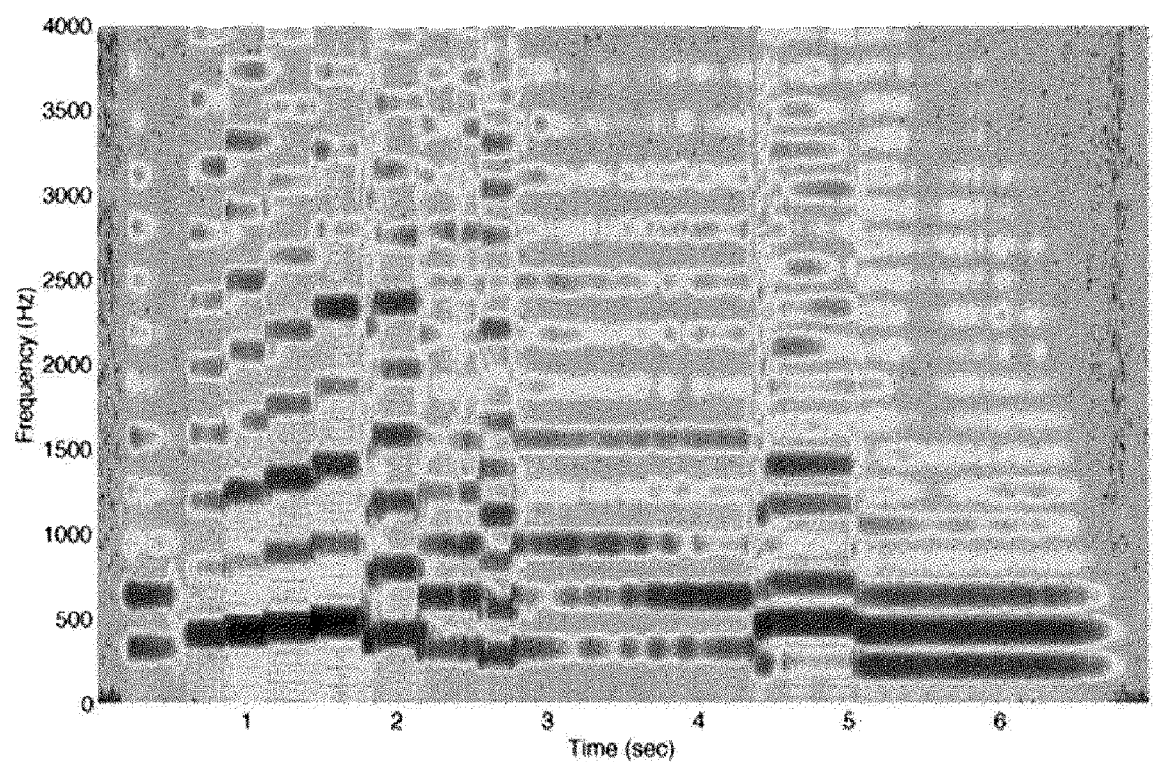
FIG. 3 illustrates a signal pattern obtained by analyzing the input audio signal of FIG. 2 for each time and frequency band according to the exemplary embodiment of the present invention.

FIG. 3 illustrates a signal pattern obtained by analyzing the input audio signal of FIG. 2 for each time and frequency band according to the exemplary embodiment of the present invention.

Referring to FIG. 3, a horizontal axis represents a time axis, and a vertical axis represents a frequency axis, and a crossing point of time and frequency represents a size of a signal.

Blue represents a signal having a small size at a corresponding frequency at a corresponding time, and red represents a signal having a large size.

As illustrated in FIG. 3, when the audio signal is analyzed for each time and frequency band, a unique audio signal pattern may be generated, and when the degree of matching of the generated signal pattern and a target audio signal pattern desired by a user is analyzed, a matching rate is equal to or larger than a threshold value, a corresponding haptic signal is generated. The signal pattern generated from the audio signal is compared with the previously stored signal pattern, so that a hitting rate is considerably high according to the matching rate.

The scaling unit 130 scales the generated signal pattern in consideration of a difference in a size between a feature point of the signal pattern generated in the signal pattern generating unit 110 and a feature point of the target audio signal pattern stored in the target pattern storing unit 120.

The pattern comparing unit 140 compares the target audio signal pattern received from the target pattern storing unit 120 or the scaling unit 130 and the signal pattern generated by the signal pattern generating unit 110.

The pattern comparing unit 140 may extract the feature points of the target audio signal pattern and the generated signal pattern and calculate a matching rate based on the difference between the feature points. When the matching rate is calculated based on the difference between the corresponding feature points by extracting the feature points of the two signal patterns, a matching rate calculating time may be reduced, compared to the case where the entire signal patterns are compared in the related art.

Referring to FIG. 2 again, the pattern comparing unit 140 may compare the signal patterns for a specific frequency band for a specific time of the signal pattern illustrated in FIG. 2.

When it is determined that the specific frequency band for the specific time of the signal pattern is a region of the signal pattern having a feature that distinguishes the target audio signal from other audio signals as the result of the comparison of the signal patterns by the pattern comparing unit 140, the time and the frequency band in the pattern of the target audio signal may be reduced to the specific time and the specific frequency band.

When the matching rate is larger than the threshold value as the result of the comparison by the pattern comparing unit 140, the haptic signal generating unit 150 generates a haptic signal corresponding to the target audio signal pattern.

In the meantime, when the haptic signal corresponding to one target audio signal pattern is excessively generated a certain number of times or more by counting the number of times of the generation of the haptic signal, there is a high probability that a matching error has occurred, so that the threshold value of the matching rate may be increased.

The motor driving unit 160 receives the haptic signal from the haptic signal generating unit 150 and drives the haptic motor.

FIG. 4 is a flowchart illustrating a haptic signal generating method according to the exemplary embodiment of the present invention.

Referring to FIG. 4, the haptic signal generating method according to the present exemplary embodiment includes operations that are time-series processed by the haptic signal generating device illustrated in FIG. 1. Accordingly, even if omitted below, the descriptions above with respect to the haptic signal generating device illustrated in FIG. 1 are also applied to the haptic signal generating method according to the present exemplary embodiment.

In operation 410, the haptic signal generating device analyzes a received audio signal and generates a signal pattern consisting of sizes of signals for each time and frequency band.

The received audio signal may be analyzed in a time domain or may be converted into a frequency domain and analyzed. When the audio signal is converted into the frequency domain, the audio signal may be converted into the frequency domain for each frequency band by using Fast Fourier Transform (FFT).

In operation 420, the haptic signal generating device scales the generated signal pattern in consideration of a difference in a size between a feature point of the signal pattern generated in operation 410 and a feature point of the target audio signal pattern stored in the target pattern storing unit 120.

In operation 430, the haptic signal generating device compares the target audio signal pattern and the generated signal pattern.

The signal patterns may be compared by extracting the feature points of the target audio signal pattern and the generated signal pattern and calculating a matching rate based on the difference between the feature points. When the matching rate is calculated based on the difference between the corresponding feature points by extracting the feature points of the two signal patterns, the matching rate calculation time may be reduced, compared to the case where the entire signal patterns are compared.

In the meantime, when it is determined that a specific frequency band for a specific time of the signal pattern is a region of the signal pattern having a feature that distinguishes the target audio signal from other audio signals as the result of the comparison of the signal patterns, the time and the frequency band in the pattern of the target audio signal may be reduced to the specific time and the specific frequency band.

In operation 440, when the matching rate exceeds the threshold value, the haptic signal generating device proceeds to operation 450, and when the matching rate does not exceed the threshold value, the haptic signal generating device ends the method.

In operation 450, when the matching rate exceeds the threshold value as the result of the determination in operation 440, the haptic signal generating device generates a haptic signal corresponding to the target audio signal pattern.

In the meantime, when the haptic signal corresponding to the target audio signal pattern is excessively generated a certain number of times or more by counting the number of times of the generation of the haptic signal, there is a high probability that a matching error has occurred, so that the threshold value of the matching rate may be increased.

The haptic signal corresponding to the target audio signal pattern may be stored in the target pattern storing unit 120 and then transmitted to the haptic signal generating unit 150.

The exemplary embodiments of the present invention may be implemented in the form of a program command that can be executed through various computer means and recorded in a computer readable medium. The computer readable medium may include a program command, a data file, a data structure, and the like alone or in combination. The program command recorded in the medium may be specially designed and configured for the present invention or may also be known and usable to those skilled in computer software. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

Accordingly, the spirit of the present invention shall not be determined while being limited to the foregoing exemplary embodiments, and it will be considered that all matters having equivalent or equivalent modifications to the claims are within the scope of the present invention.

The invention claimed is:

1. A method of generating a haptic signal, the method comprising:
   generating a signal pattern consisting of a size of a signal for each time and frequency band by analyzing a received audio signal;
   comparing a target audio signal pattern and the generated signal pattern; and generating a haptic signal corresponding to the target audio signal pattern when a matching rate exceeds a threshold value as a result of the comparison.

2. The method of claim 1, further comprising:

scaling the generated signal pattern in consideration of a difference in a size between a feature point of the generated signal pattern and a feature point of the target audio signal pattern.

3. The method of claim 1, wherein the matching rate is calculated based on a difference between feature points by extracting the feature points of the target audio signal pattern and the generated signal pattern.

4. A device for generating a haptic signal, the device comprising:

a signal pattern generating unit for generating a signal pattern consisting of a size of a signal for each time and frequency band by analyzing a received audio signal;

a pattern comparing unit for comparing a target audio signal pattern and the generated signal pattern; and a haptic signal generating unit for generating the haptic signal corresponding to the target audio signal pattern when a matching rate exceeds a threshold value as a result of the comparison.

5. The device of claim 4, further comprising:

a scaling unit for scaling the generated signal pattern in consideration of a difference in a size between a feature point of the generated signal pattern and a feature point of the target audio signal pattern.

6. The device of claim 4, wherein the pattern comparing unit extracts feature points of the target audio signal pattern and the generated signal pattern and calculates the matching rate based on a difference between feature points.

7. A non-transitory computer-readable storage medium in which a program for executing the method of claim 1 in a computer is recorded.

* * * * *